(No Model.)
G. L. LAUGHTON.
DERRICK FORK.
No. 483,765.    Patented Oct. 4, 1892.
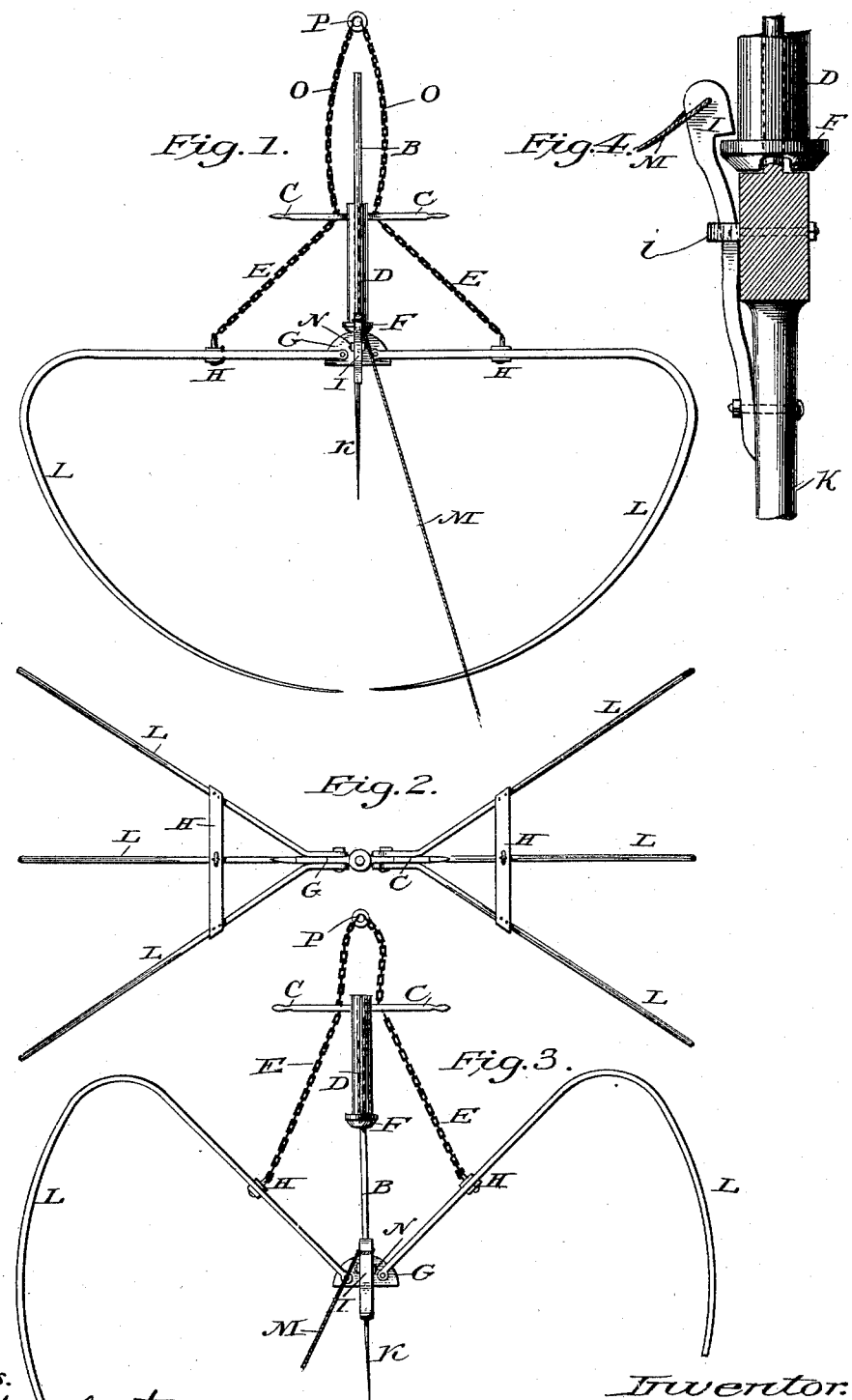
Witnesses.
Morrell J. Curtis
Frank S. Berry
Inventor:
George Lennon Laughton

UNITED STATES PATENT OFFICE.

GEORGE LEMMON LAUGHTON, OF RENO, NEVADA.

DERRICK-FORK.

SPECIFICATION forming part of Letters Patent No. 483,765, dated October 4, 1892.

Application filed November 19, 1891. Serial No. 412,583. (No model.)

*To all whom it may concern:*

Be it known that I, GEORGE LEMMON LAUGHTON, a citizen of the United States, residing at Reno, in the county of Washoe, in the State of Nevada, have invented a new and useful improvement in derrick-forks for raising and unloading hay and similar substances in connection with derricks on stacks, mows, and otherwise, of which the following is a specification.

My invention relates to certain new and useful improvements in horse hay-forks employed in hoisting and storing and stacking hay; and it consists in the novel construction and arrangement of parts hereinafter fully described, and afterward definitely pointed out in the claims, due reference being had to the accompanying drawings, forming a part of this specification, wherein—

Figure 1 is a side elevation of my improved device closed; Fig. 2, a top plan view; Fig. 3, a side elevation, the tongs being shown open; and Fig. 4, a detail view of the catch or locking mechanism.

Referring to the drawings, the letter B indicates a shaft provided at its lower end with a spear-point K. At a suitable distance above the spear K and formed integral with the shaft B is a semicircular plate G. Upon each side of the plate G are pivotally-bolted tines L, there preferably being three tines upon each side, which are spread apart and secured together by braces H, as shown in Fig. 2. Said tines when closed extend from each side of the plate G for a suitable distance at right angles to said plate and thence curve downwardly and inwardly toward each other. Upon the upper portion of the shaft B is fitted to slide a hollow cylinder D, provided at its upper end with handles C and at its lower end with a collar F. The collar F is beveled upon its lower side, as shown in Fig. 4, and the cylinder D when the tongs are closed rests upon the upper edge of the plate G.

I indicates a spring-catch bolted at its lower end or otherwise suitably connected to the upper portion of the spear K. Said catch at its upper end is hooked and engages the collar F, as shown, to lock the cylinder D upon the shaft B. *i* indicates a guard or loop, which loosely embraces said spring-catch and is bolted to the plate G. Said guard or loop serves to prevent the spring I from being pulled too far away from the plate G, which would result in breaking it. To the catch I is secured a cord or rope M for the purpose hereinafter described.

E E indicate chains, which are secured at their lower ends to the braces H of the tines and at their upper ends are secured to the the handle C, carried by the cylinder D. To said handles are also secured chains O, which at their upper ends are fastened to a ring or link P, to which the hoisting-rope is designed to be attached.

The operation of the device is as follows: The tines being open, the operator grasps the handles of the cylinder D and forces said cylinder D down, which thrusts the spear K into the hay. The tines L are then forced down into the hay. As the cylinder D is forced down the lower beveled side of the collar F pushes aside the spring-catch I under the cylinder, which rests upon the upper edge of the plate G, when the hooked end of the catch engages the upper side of the collar F and locks the cylinder upon the shaft B. The parts are then in the position shown in Fig. 1. The fork, together with its load, is then hoisted by the chains O and conveyed to the desired point. The rope M, connected with the catch I, is then given a quick pull, releasing the catch from the collar F, when the weight of the load causes the shaft B and the tines to drop and brings the strain upon the chains E, which lift the tines L out of the hay and allows the load to drop.

What I claim is—

1. In a horse hay-fork, the combination, with the shaft B, provided at its lower end with a spear K and carrying a plate G, of curved tines pivoted to said plate, the cylinder D, sliding on said shaft and carrying a collar F and handles C, the spring-catch I, secured to the plate G and engaging the collar F, and chains E, secured to the tines and to the handles C, and chains O, secured to said handles and adapted to be connected with the hoisting apparatus, substantially as described.

2. In a horse hay-fork, the combination, with the shaft B, provided at its lower end with a spear K and carrying a plate G, of curved tines pivoted to said plate, the cylinder D, sliding on said shaft and carrying a collar F, beveled upon its lower side, and handles C, the spring-catch I, secured to the plate G and engaging the collar F, and chains E, secured to the tines and to the handles C, and chains O, secured to said handles and adapted to be connected with the hoisting apparatus, substantially as described.

GEORGE LEMMON LAUGHTON.

Witnesses:
JEFFERSON D. BRADLEY,
SYLVAN W. ASPRON.